United States Patent [19]

Lacko, Sr.

[11] 4,256,162
[45] Mar. 17, 1981

[54] SPLIT RIM TIRE CHANGER

[76] Inventor: Lorant Lacko, Sr., 10619 W. Exposition, Lakewood, Colo. 80226

[21] Appl. No.: 28,215

[22] Filed: Apr. 9, 1979

[51] Int. Cl.³ .............................................. B60C 25/06
[52] U.S. Cl. ................................................. 157/1.28
[58] Field of Search ...................... 157/1.2, 1.26, 1.28

[56] References Cited

U.S. PATENT DOCUMENTS

| | | | |
|---|---|---|---|
| 2,418,849 | 4/1947 | Polt | 157/1.28 X |
| 2,893,478 | 7/1959 | Crawford | 157/1.2 |
| 3,581,795 | 6/1971 | Bunch | 157/1.2 |
| 3,630,260 | 12/1971 | Bailey | 157/1.26 |
| 3,739,831 | 6/1973 | Smith | 157/1.28 |

*Primary Examiner*—James G. Smith
*Attorney, Agent, or Firm*—W. Britton Moore

[57] ABSTRACT

A tire changing apparatus for installing on and/or removing heavy duty tires of the truck type from their split rims including a vertically and horizontally extending boom rotatably mounted on an upright stand for swinging movement about a vertical axis and having a downwardly depending post for fixedly locking the boom directly above the stand. The boom has a centrally disposed air cylinder thereon with a depending piston rod carrying a cage-like circular ram. When the boom with ram and lockable post are swung arcuately away from overhead aligned position relative to the stand, a tire with split rim is horizontally positionable on a center stand pedestal and the boom is returned to its normal overhead position and relocked. Hydraulic or pneumatic actuation of the cylinder piston moves the ram downwardly against and to free the tire casing relative to its split rim permitting prying removal of the rim from the tire. Installation is effected by horizontally positioning a split rim on the pedestal and placing a tire thereabove and thereon whereupon pressure actuation of the ram forces the tire on the rim and permits air inflation of the tire. The ram cage confines the split rim and protects the operator in the event of forceful accidental dislodgement.

3 Claims, 5 Drawing Figures

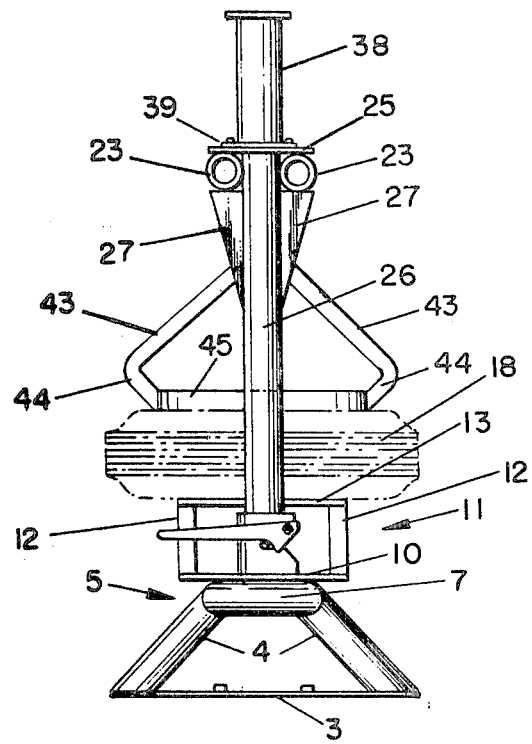
FIG. 3
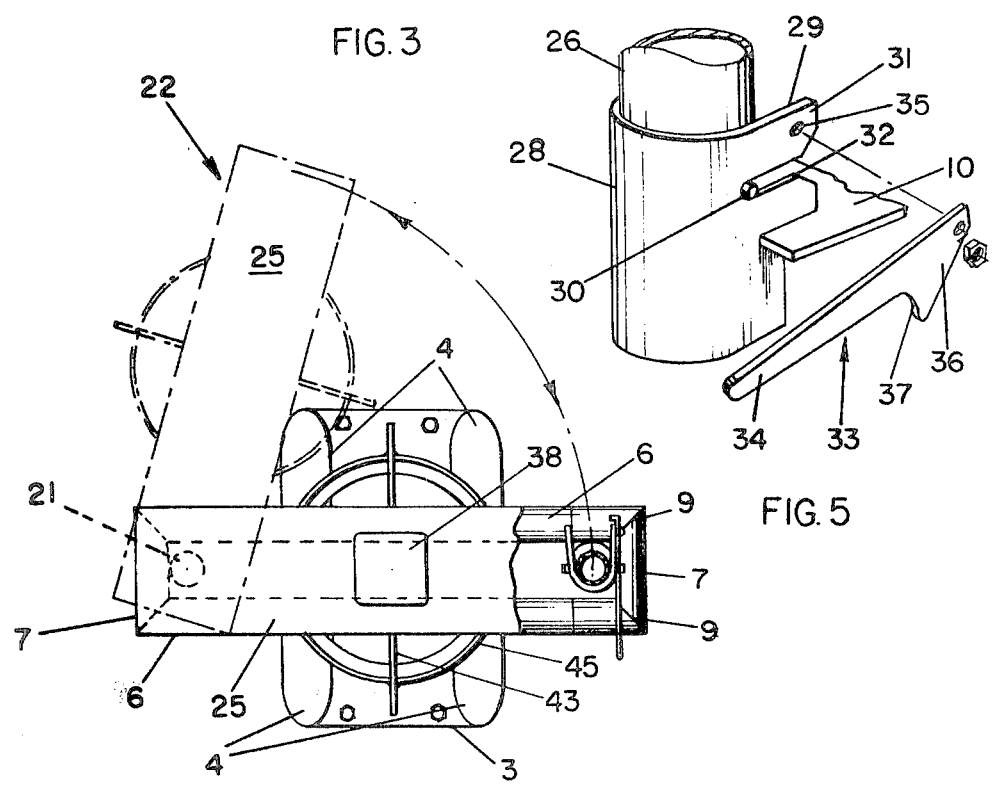
FIG. 4
FIG. 5

SPLIT RIM TIRE CHANGER

BACKGROUND OF THE PRESENT INVENTION

This invention relates to a split rim tire changer.

While many tire changing devices have heretofore been proposed, such as those of U.S. patents to Foster U.S. Pat. No. 3,003,544, Dragoo et al U.S. Pat. No. 3,156,289, Copeland et al U.S. Pat. No. 3,354,928, and Mueller U.S. Pat. No. 3,978,928 for demounting and assembling or seating tubeless tires on their rims, none thereof suggest a relatively simple and easily operable device peculiarly designed for handling heavy duty tires of the truck type mounted on split rims wherein care must be exercised to so break the tire relative to the split portion of the rim that the latter may be pried loose and removed without danger to the operator in the event of sudden and accidental dislodgement.

SUMMARY OF THE INVENTION

The principal object of the present invention is to provide a relatively simple and compact hydraulic or pneumatic split rim tire changer apparatus embodying an upright stand for horizontally positioning a heavy duty split rim tire thereon, with a vertically and horizontally extending boom supported thereon for rotational swinging movement about a vertical axis relative thereto, and having a hydraulic cylinder on the swingable boom wherein the piston rod thereof carries a cage-like circular ram vertically movable into engagement with and for freeing the tire relative to its rim and permitting prying removal of the split rim portion thereof.

Another object is the provision of a stand including a rotatably mounted tubular post having a laterally projecting horizontal boom thereon with a hydraulic or pneumatic cylinder on and a cage-like circular ram depending therefrom for engagement with a horizontally positioned split rim tire supported on the stand, and wherein the post and boom are swingable about a vertical axis to permit mounting and demounting of the tire and split rim.

Still another object is the provision of a novel boom including a rotatably mounted post and a pair of spaced parallel horizontal tubes with a flat plate for centrally mounting a vertical hydraulic or pneumatic cylinder thereon and on the depending piston thereof is mounted a spaced and diverging leg ram formed with a circular rim vertically movable into and out of engagement with the horizontally supported split rim tire.

A further object is to provide a boom with a depending tubular post thereon arcuately movable into a socket on the supporting stand and having a latching member associated therewith for locking the post and boom in operative position and freeing the boom for swingable movement in operative position relative to the stand.

A still further object is the provision of a compact, relatively light, and easily operated hydraulic or pneumatic split rim tire changer wherein the cage-like circular rim protects the operator in the event of sudden and unexpected disengagement of the split rim during demounting or mounting operations.

These and other objects and advantages will be apparent as the specification is considered with the accompanying drawings, wherein FIG. 1 is a perspective view of the hydraulic or pneumatic split rim tire changer in the operative position assumed during mounting and demounting of the tire and split rim;

FIG. 3 is an end elevation of the apparatus shown in FIG. 1;

FIG. 4 is a top plan view of the assembled apparatus, showing the arcuate swinging movement of the boom thereof; and FIG. 5 is a perspective view of the boom post receiving socket and the locking latch pivotally associated therewith.

Heavy duty tires of 10-12 ply for trucks and other heavy duty vehicles cannot be stretched to go over a rim in the same manner as passenger car tires. To permit installation of these tires, the rim is made in two parts, the basic rim with a large O.D. side and small O.D. side, and a split rim which equalizes the diameters when installed. To install a tire, the tire is placed onto the rim from the small O.D. side, the split rim is then stretched over the small O.D. side and snaps into place over the rim and against the bead of the tire. One problem faced by an operator installing a tire on a split rim is the danger of the split rim exploding outward when air pressure is applied to the tire with resulting injury. The present invention prevents such accidental explosions of the split rim injuring the operator.

Figure 1:
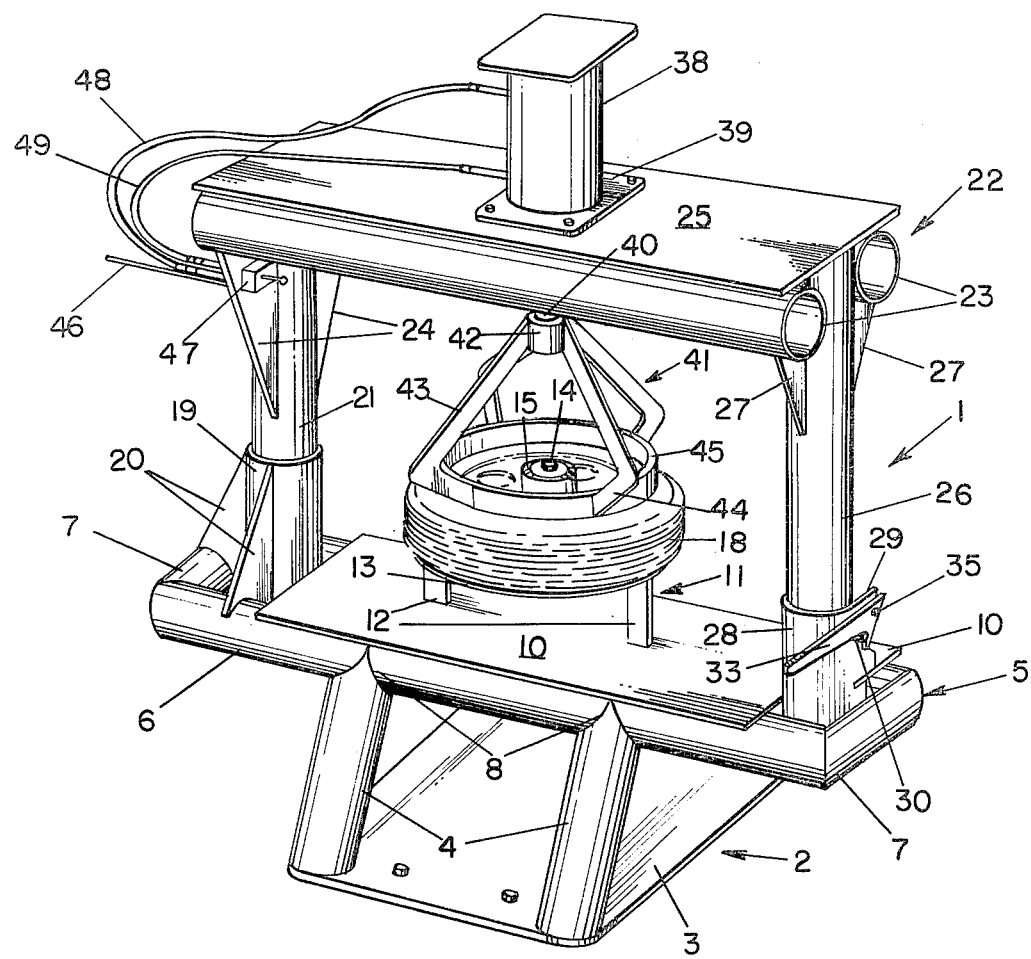
Figure 2:
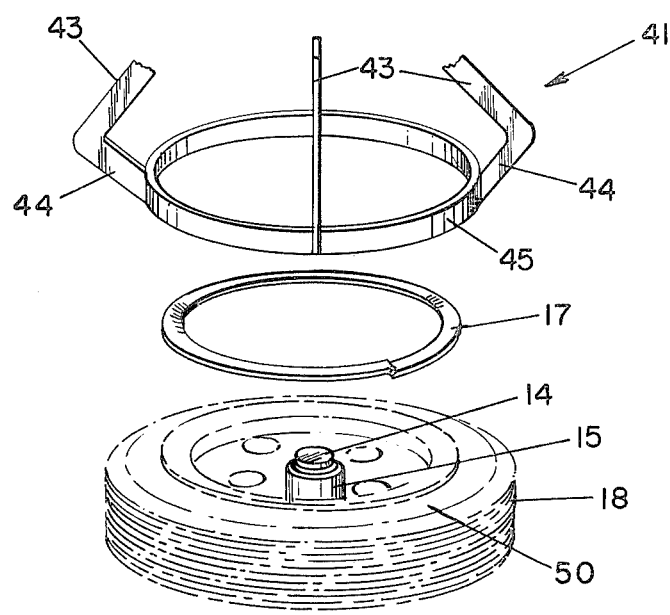
FIG. 2 is an exploded perspective view of a portion of the cage-like ram, split rim, and tire.

Referring more specifically to the drawings, wherein similar reference characters designate like parts throughout the several views, numeral 1 generally refers to the metal hydraulic or pneumatic split rim tire changing apparatus hereof which, as best shown in FIG. 1, includes a supporting stand 2 with a generally rectangular flat base plate 3 supporting four inwardly, upwardly, and oppositely converging tubular metal corner posts 4, suitably connected to the tubular sides, as at 8, of an elevated, horizontally disposed, tubular, rectangular base frame 5 including spaced inside 6 and end cylindrical tubes 7, suitably welded or otherwise connected at the corners as at 9. A flat support plate 10 is arranged on and suitably affixed to tubular base frame 5, and mounted centrally thereon and suitably attached thereto are the upright legs 12 of a standoff or support 11 with a flat horizontal plate 13 and a central pedestal 14 thereon and suitably secured thereto over which is sleeved a bushing 15 for mounting a truck vehicle wheel 16, split rim 17, and heavy duty tire 18 thereon so that it is a horizontally disposed and supporting for mounting and demounting, as presently will be described.

Suitably attached within one end of elevated base frame 5 and suitably affixed to the end 7 and side tubes 6 thereof by spaced radial welded gussets or the like 20 is a vertically extending cylindrical socket 19, best shown in FIG. 1, and rotatably sleeved and retained therein is an upright cylindrical post 21. The latter extends at its upper end between a pair of spaced parallel elongated cylindrical tubes 23 of a laterally extending and horizontally disposed upper boom member 22, and is suitably secured thereto by arcuately spaced welded gussets or the like 24. Supported on and spanning and suitably secured by welding or the like, not shown, uppermost of tubes 23 and coinciding in length therewith is a flat generally rectangular horizontal boom plate 25.

The upper end of a vertical cylindrical post 26 extends between the ends of spaced boom tubes 23 and is suitably weldably attached thereto by spaced radial gussets or the like 27, and depends downwardly therefrom with its lower end projectable through a side opening 29 in an upright semi-cylindrical socket 28. The latter is positioned between and welded, or otherwise suitably secured, to one end of the base frame 5 and the spaced side and end cylindrical tubes 6 and 7 thereof. Spaced above the lower end of post 26 and projecting laterally from one side thereof is a pin 30 which is receivable in a horizontal slot 32 in one side 31 of socket 28 (FIG. 5) when the post is positioned therein. A latching lever 33 with a elongated handle 34 is pivoted at one end, as at 35, to the side 31 of socket 28 above and at the flared entry end of slot 32, and the pivoted end of the lever 33 is formed with a downwardly tapered enlargement 36 which is hooked, as at 37. Thus, when the post 26 is received in socket 28 the pin 30 thereon will project beyond slot 32, and downward pivotal movement of lever 33 will position the hooked portion 37 thereof in latching engagement with pin 30 and lock the post in its socket and retain the boom in aligned overhead position with respect to the support plate 10 and vehicle wheel arranged thereon.

A conventional hydraulic or pneumatic cylinder 38 is vertically mounted by bolted plate 39 in the center of boom plate 25 and includes the usual piston, not shown, and piston rod 40 projecting downwardly through plate 25. The lower end of piston rod 40 is fixedly attached to a bushing 42 on the upper end of a cage-like ram 41 including four spaced radially and outwardly angled legs 43 attached to and depending from the bushing 42, with the lower ends bent inwardly, as at 44, and suitably affixed to a circular rim band 45. Air or hydraulic fluid from a suitable source, not shown, is introduced through line 46 to a suitable conventional control valve 47 suitably mounted on the boom, such as on a gusset 24 thereon, which selectively controls flow through a downstroke line 48 to the upper end of cylinder 38 above the piston and an upstroke line 49 to the lower end thereof below the piston.

From the foregoing, it will be understood that with boom member 22 swung to the dotted line position of FIG. 4, a heavy duty tire and wheel may be arranged on central pedestal 14 and bushing 15 thereon, whereupon the boom member may be returned to the position of FIG. 1, and the post 25 latched in its socket 28, with the boom vertically aligned with the base frame 5. To demount the tire from its split rim, control valve 47 is actuated to introduce air or fluid through line 48 and force cylinder piston and piston rod 40 downwardly so that the cage-like ram 41 and the circular rim band 45 thereon is forced downwardly into engagement with and presses the tire casing 50 below and frees the same relative to the split rim portion 17 of the tire rim. The latterthus becomes accessible to and may readily be pried loose by the operator, and the ram 41 may then be raised and boom member 22 swung to inactive position, to then permit removal of the split rim and the tire relative to its rim. During this pressing action of the ram and prying of the split rim, the four spaced legs of the ram cage will overlie and confine the tire and rim and prevent the operator from being injured by any sudden or accidental dislodgement of the split rim.

When installing a tire on a split rim, the deflated tire and main rim is arranged on the pedestal and the ram 41 is lowered until the rim band 45 thereof presses against the tire casing, at which time the split rim 17 is stretched over the small O.D. side of the rim and snaps into place over the rim and against the bead of the tire. During inflation of the tire, the cage-like ram will confine and prevent accidental explosion of the split rim from injuring the operator.

While a preferred embodiment of split rim tire changer or press has been shown and described, it is to be understood that various changes and improvements may be made therein without departing from the scope and spirit of the appended claims.

What I claim is:

1. In an apparatus for changing heavy duty tires from their split rims comprising a base, a generally rectangular flat base frame plate arranged above and supported on said base by spaced parallel tubular side and end members, pedestal means on said base for horizontally supporting a tire and split rim thereon, cylindrical socket means at one end of said base frame, first vertical cylindrical post means rotatably sleeved within said socket means, generally rectangular flat boom plate means mounted and supported on one end to the upper end of said post means, said boom plate means includes spaced parallel tubular side and end members, a second cylindrical post means at the other end of said boom plate means and depending vertically therefrom, said boom plate means being swingable with said first post means relative to said socket means and base frame, latching means at one end of said base frame including a vertical semi-cylindrical socket coactable with and for receiving the lower end of and for locking said second post means and said boom plate means in alignment with said base frame when the latter and said boom plate means are swung to active position, fluid cylinder means centrally and vertically arranged on said boom plate means and having piston rod means projecting downwardly of said boom plate means, cage-like ram means carried by said piston rod means including radially spaced downwardly and outwardly angled leg members, a circular rim band mounted on the lower ends of said leg members and overlying said horizontally mounted tire and split rim means for introducing fluid from a source into said cylinder means to vertically move said ram means and rim band into pressing engagement with and to force the tire from said split rim and permit removal of the latter, said boom plate means being swingable from an active overhead position to an inactive position away from said base frame for mounting and demounting the tire and split rim on the pedestal means thereof.

2. In an apparatus for changing heavy duty tires from their split rims according to claim 1, wherein pin means projects laterally from said second post means, and said socket is recessed to receive said pin means, latching lever means pivoted to said socket and movable into latching engagement with said pin means to lock said second post means in said socket.

3. In an apparatus for changing heavy duty tires from their split rims according to claim 2, wherein said socket recess includes a horizontal slot, and said latching lever has a tapered enlargement with a hook thereon for interengaging with and latching said pin means.

* * * * *